United States Patent [19]

Helldörfer et al.

[11] Patent Number: 5,021,962
[45] Date of Patent: Jun. 4, 1991

[54] NAVIGATION METHOD FOR VEHICLES WITH ELECTRONIC COMPASS

[75] Inventors: Reinhard Helldörfer, Igelsdorf; Ulrich Kanzler, Stein; Hans Rauch, Fürth; Eva Osterkamp, Burgthann, all of Fed. Rep. of Germany

[73] Assignee: Robert Bosch GmbH, Stuttgart, Fed. Rep. of Germany

[21] Appl. No.: 378,182
[22] PCT Filed: Oct. 22, 1987
[86] PCT No.: PCT/DE87/00479
§ 371 Date: Jun. 26, 1989
§ 102(e) Date: Jun. 26, 1989
[87] PCT Pub. No.: WO88/05154
PCT Pub. Date: Jul. 14, 1988

[30] Foreign Application Priority Data

Dec. 30, 1986 [DE] Fed. Rep. of Germany ....... 3644683

[51] Int. Cl.$^5$ .............................................. G01C 17/38
[52] U.S. Cl. ..................................... 364/457; 33/356; 33/357; 364/559
[58] Field of Search ............. 364/559, 424.01, 571.01, 364/571.03, 444, 457; 33/356, 357

[56] References Cited

U.S. PATENT DOCUMENTS

| | | | |
|---|---|---|---|
| 4,179,741 | 12/1979 | Rossani | 364/559 X |
| 4,413,424 | 11/1983 | Sasaki et al. | 364/559 X |
| 4,429,469 | 2/1984 | Tsushima et al. | 33/361 |
| 4,497,034 | 1/1985 | Kuno et al. | 364/559 |
| 4,600,883 | 7/1986 | Egli et al. | 324/207 |
| 4,763,268 | 8/1988 | Itoh et al. | 364/449 |
| 4,782,453 | 11/1988 | Bauer et al. | 364/559 |
| 4,797,841 | 1/1989 | Hatch | 364/571.04 |
| 4,814,989 | 3/1989 | Döbereiner | 364/444 |
| 4,866,627 | 9/1989 | Suyama | 364/457 |

Primary Examiner—Thomas G. Black
Attorney, Agent, or Firm—Michael J. Striker

[57] ABSTRACT

A method for determining the north direction or the travel direction of a vehicle having an electronic compass is proposed by means of which field disturbances at the magnetometer of the compass, occurring during the navigation drive, are measured and evaluated for avoiding angle errors on the direction indication of the compass. For this purpose, the measurement values (Px, y) of the magnetometer are continuously checked by an evaluating circuit of the navigation system and with a deviation (Δx, y) of several successive measurement values past a predetermined tolerance range (A) of the locus diagram and a simultaneous angle change of the earth's magnetic field vector, an intervention is effected in the direction indication. In this connection, according to the invention, the rate of change (Δ$\varphi$/t) of the direction indicated by the compass is limited to a predetermined value (B/C), this limit value (B/C) being weighted in dependence on the duration (t1, t2) of the measurement value deviation and the limit of the rate of the indicated direction change (Δ$\varphi$/t) (FIG. 4).

10 Claims, 2 Drawing Sheets

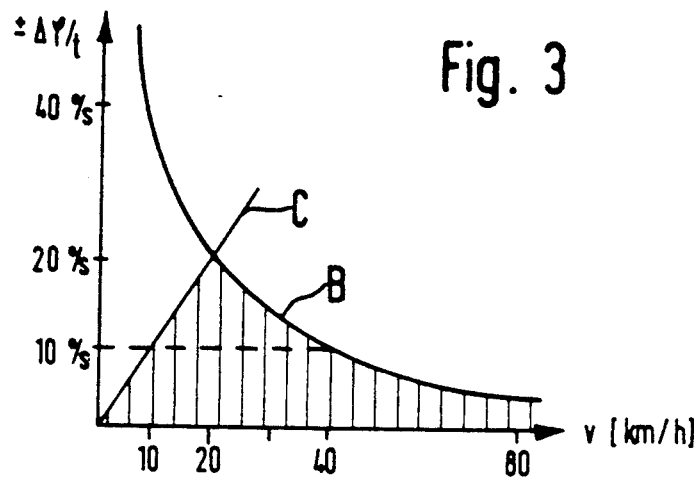
Fig. 3
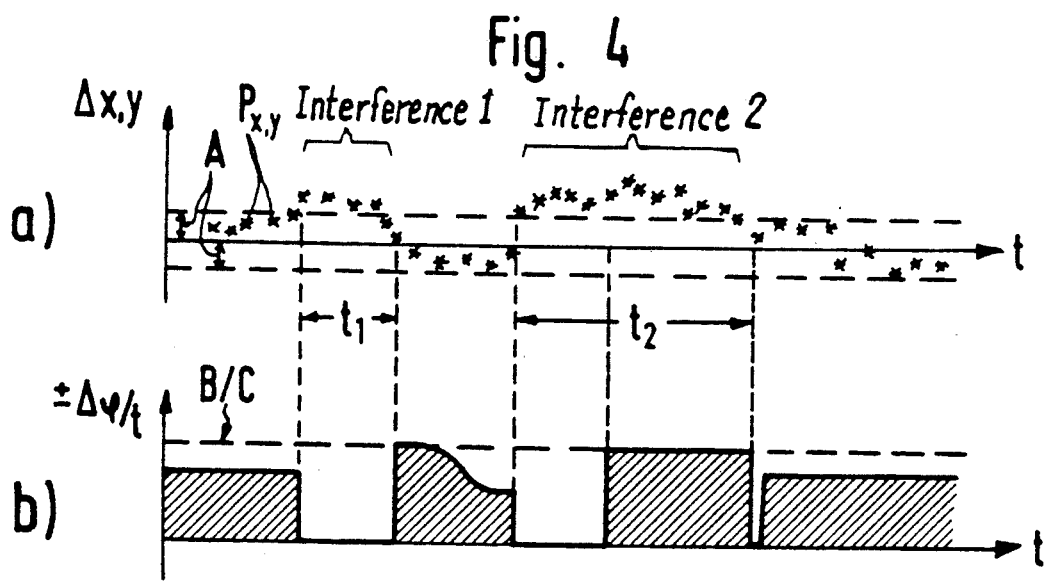
Fig. 4
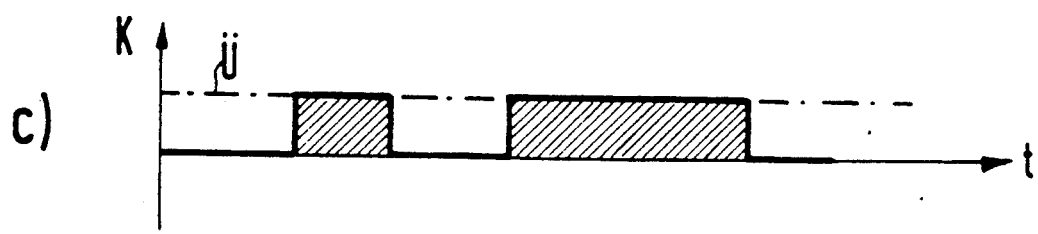

NAVIGATION METHOD FOR VEHICLES WITH ELECTRONIC COMPASS

BACKGROUND OF THE INVENTION

The invention is based on a method for determining the north direction or the travel direction of a vehicle having an electronic compass including a magnometer fixedly arranged in the vehicle and an evaluating circuit which cyclically receives the measurement values of the magnetic field vector effective at and measured by the magnetometer and processes the measurement values to check a predetermined elliptical locus diagram and to determine parameters of the travel direction and to correct the locus diagram during a deviation of several successive measurement values from a predetermined value of the locus diagram.

Such a method for correcting the elliptical locus diagram determined for the magnetic field vector effective at the magnetometer is known from German Offenlegungsschrift 3,509,548. In this document, it is proposed to check the values of the magnetic field, measured by the magnetometer, with respect to a deviation from the determined locus diagram and in each case then to perform a correction of the locus diagram whenever deviations of the measurement values from the locus diagram exceed a particular amount several times. The disadvantageous factor in this prior art method is that the angle errors in the direction indication, occurring due to magnetic field disturbances, are corrected only very inadequately and too slowly by this method.

In a heading measuring device known from German Patent Specification 2,651,678, the magnetic field sensor is caused to switch to a further sensor for correcting angle errors during the occurrence of magnetic field disturbances, if the values measured by the magnetic field sensor deviate from a nominal value by a predetermined amount. In this prior art arrangement, it is disadvantageous that an additional sensor is needed and at least partially is influenced by the earth's magnetic field and thus by external field disturbances.

SUMMARY OF THE INVENTION

The present invention has the object of suppressing or limiting navigation errors due to interfering fields or interfering field changes acting on the magnetometer with angle disturbances occurring for a short time or longer term, to enable the direction to be indicated as accurately as possible during the disturbances and thereafter.

The method according to the invention, characterized in that, with a deviation of the measurement values from the elliptical locus diagram (0) and with a simultaneous angle change of the earth's magnetic field vector, the rate of change of the direction indicated by the compass is limited to a predetermined value and that the limiting of the rate of change of the direction indication is weighted in dependence on the duration of the measurement value deviation the characterizing the advantage of the that, when interfering fields or interfering field changes occur, the correction influence is weighted in dependence on the duration of the deviation of the measurement value from the nominal value to suppress or limit changes in the direction indication.

Advantageous further developments and improvements of the features specified in the main claim are possible by means of the measures listed in the subclaims. For this purpose, it is particularly suitable to suppress a change in the direction indication completely with a short-time deviation of the measurement values from the elliptical circle diagram past the predetermined permissible amount. With a longer-duration deviation of the measurement values from the nominal value of the elliptical circle diagram past a predetermined amount, the rate of change of the direction indication is advantageously limited to a maximum value depending on the vehicle speed. In this arrangement, the maximum values of the change in direction, dependent on the vehicle speed, are suitably determined by means of the limit of the permissible transverse acceleration of the vehicle and these values are stored in a data memory of the evaluating circuit. At the end of the inadmissible measurement deviation, the direction of the earth's field then determined via the circle diagram is suitably used directly and without correction again for determining the direction indication.

BRIEF DESCRIPTION OF THE DRAWING

An illustrative embodiment of the invention is shown in the drawing and explained in greater detail in the following description.

FIG. 3 shows a graph of the maximum values of the angle changes, dependent on the vehicle speed, and FIG. 4 shows the variation with time during the correction of the direction indication with the occurrence of magnetic disturbances during the navigation drive.

DESCRIPTION OF THE PREFERRED EMBODIMENT

Figure 1:
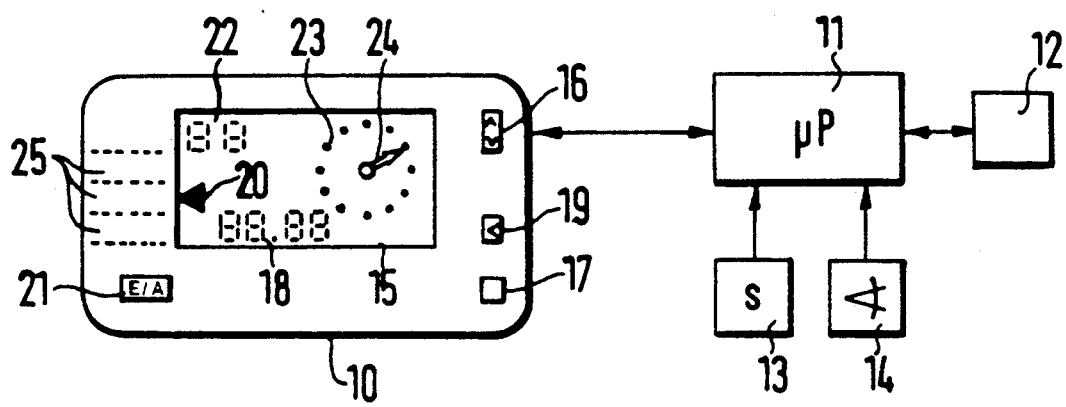
FIG. 1 shows a block circuit diagram of a navigation system for a motor vehicle.

FIG. 1 shows a compound navigation system for vehicles by means of which the driver can find the desired destination in strange surroundings by specifying the direction of the destination and the linear distance (homing system). It consists of an input and output unit 10, a microprocessor 11 having a data memory 12, a position transmitter 13 and a travel direction transmitter 14. The microprocessor 11 is usually contained, together with the data memory 12, in the input and output unit 10. Pulse transmitters of a tachogenerator or corresponding transmitters at the vehicle wheels, which may already be present in the vehicle can be used as position transmitter 13 A magnetometer or a magnetic field meter are used as travel direction transmitter 14. The microprocessor 11 processes the signals emitted by the position transmitter 13 and by the magnetometer 14 and it executes the control and input commands enabled by the operating keys of the unit 10. Furthermore, it controls the output of data and direction arrows on a liquid crystal display (LCD) 15 of the unit 10. Numerical values can be changed in the direction of 'higher' and 'lower' on the LCD 15 by means of a toggle key 16. The numerical value currently displayed on the LCD 15 is in each case stored by operating an acknowledgement key 17 and output on a display 18 in the lower area of the LCD 15. A function selection key 19 is used for switching the navigation system over within a menu offered in accordance with the inscription 25 on the left-hand edge area of the unit 10, the information items displayed in each case on the LCD 15 being identified by an arrow 20 on the LCD 15 at the level of the inscription 25. A further key switch 21 is used for switching the compound navigation system on and off. A 7-segment display 22 in the upper LCD area is used for identifying various preset destinations. A compass rose 23 of the LCD 15, having 16 different invisible arrow segments, is used for direction information, the activated direction arrow 24 representing either the north direction, the travel direction or the direction of the travelling destination.

Figure 2:
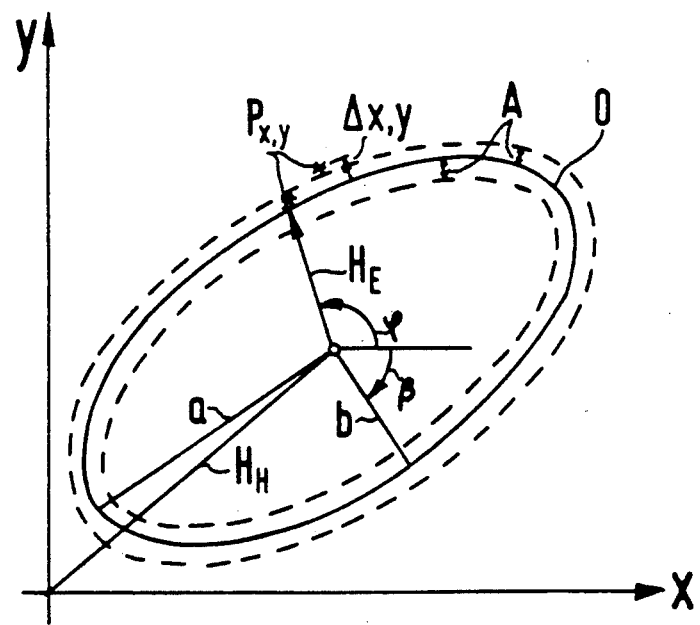
FIG. 2 shows the elliptical locus diagram of the magnetic field effective at the magnetometer of the navigation system.

The magnetometer 14 arranged fixedly in the vehicle has two probes which are offset by 90° with respect to one another, are arranged in the plane of travelling of the vehicle to measure the components of the magnetic field effective at the magnetometer 14 and cyclically output the measured values in the form of electric measurement values into the evaluating circuit 11 for determining the travel direction or the north direction. As described in greater detail in German Offenlegungsschrift 3,509,548, the displacement of the centre point of the elliptical locus diagram of the magnetic field vector from the origin of the coordinates thereby forms a direction-independent hard-magnetic interfering field vector $\vec{H}_H$ according to FIG. 2. Further parameters of the elliptical locus diagram 0 represented in FIG. 2 are the major and the minor semiaxes a, b and the rotation about the angle $\beta$ with respect to the system of coordinates x, y. During the calibration of the navigation system, these ellipse parameters are determined in known manner by means of a circle drive of the vehicle and are stored in the data memory 12. During the subsequent navigation drives, the measurement values Px, y supplied by the magnetometer 14 are then continuously acquired for determining the earth's magnetic field vector $\vec{H}_E$ and the angle $\phi$ between the earth magnetic field vector $\vec{H}_E$ and the travel direction (x-axis).

Due to a limited measurement value accuracy, the manner will now be explained, in accordance with FIG. 2 in conjunction with FIG. 4, in which a magnetic field disturbance is detected and processed. Within a predetermined band width or permissible range A, the measurement values P), y may deviate outwards or inwards from the elliptical locus drive 0 without triggering correction measures. If, however, the deviation $\Delta$x, y of several successive measurement values Px, y from the elliptical locus diagram 0 exceeds the predetermined amount A, this deviation is detected as magnetic disturbance in the navigation system. The evaluating circuit subsequently checks on the basis of the direction angle $\phi$ continuously stored in an intermediate part of the data memory 12, whether angle change $\Delta\phi/t$ of the earth's magnetic field vector $\vec{H}_E$ is present at the same time. If this is not the case, the direction angle is retained unchanged and the measurement value deviation $\Delta$x, $\Delta$y is further processed for correcting the locus curve 0 by a preferably weighted averaging of the measurement values.

If, however, an angle change $\Delta\phi/t$ is found at the same time at the evaluating circuit, the rate of change of the direction indicated by the compass is limited to a predetermined value, this value being weighted with the duration of the measurement value deviation. During a short-time deviation of the measurement values Px, y from the elliptical locus diagram 0 past the predetermined range A, a change in the direction indication $\Delta\phi/t$ is completely suppressed by the evaluating circuit. With a longer-duration deviation of the measurement values Px, y from the elliptical locus diagram 0 past the predetermined range A, the rate of change of the direction indication $\Delta\phi/t$ is limited to a maximum value which depends on the travelling speed of the vehicle.

In FIG. 3, the curve B represents the maximum values of the permissible change in direction $\Delta\phi/t$ which depend on the vehicle speed and which are obtained from the permissible transverse acceleration of the vehicle. These values can first be determined on a dry road and with good tires on the vehicle and stored in table form in the data memory 12. However, it is much simpler and more suitable to replace the table by a value for the permissible transverse acceleration which is between 0.2 and 0.4 g depending on the type of vehicle. The speed measured in each case can then be used for continuously calculating the limit value on the curve B $[\Delta\phi/t_{max}=f(v)]$. The maximum steering wheel angle of the vehicle forms a further maximum limit of the angle change $\Delta\phi/t$. This limit, which is proportional to the vehicle speed, is represented by the straight line C in FIG. 3. It can also be stored in the data memory 12. However, the limit value of the curve B is also suitably calculated continuously from the vehicle speed in this case. The greater limit value on curve A or B is then suppressed by a logic circuit and the smaller limit value is compared with the actual direction change $\Delta\phi/t$.

FIG. 4 will now be used for explaining the manner in which changes in the direction indication during the occurrence of magnetic field disturbances are corrected. FIG. 4a shows that in the first part of a navigation drive, the measurement values supplied by the magnetometer 14 still exhibit a deviation $\Delta$x, y which is within the permissible deviation range A. FIG. 4b shows that the angle change $\Delta\phi/t$ during this time is also below the permissible maximum limit which is obtained from the characteristics B and C according to FIG. 3 and is, for example, about 10°/sec at a speed of v=40 km/h. In FIG. 4c, the dot-dashed line ü shows that the measurement values are being continuously monitored by the evaluating circuit and the locus diagram 0 is being recalibrated. With the occurrence of a short-time disturbance 1 over a time t1 of about 2 seconds, any change in the direction indication $\Delta\phi/t$ is now suppressed and the direction last indicated is retained unchanged as can be seen from FIG. 4b. According to FIG. 4c, a correction signal K is now generated and the measurement value deviation $\Delta$x, y is averaged by means of a corresponding program loop of the microprocessor 11 and this value is used to correct the locus diagram 0 with a time-dependent weighting, which is less (<1) than the weighting during the recalibration of a permissible deviation. At the end of the disturbance 1, the change in the direction indication $\Delta\phi/t$ is enabled again.

Since the vehicle direction can have continuously changed during the magnetic field disturbance which occurred for a short time, this direction change must now be updated on the display. In this connection, however, the maximum values according to FIG. 3 should not be exceeded. For this purpose, it is proposed to continue the rate of change $\Delta\phi/t$ of the direction indication 24 with the speed-dependent maximum value B and C until the actual direction is indicated or the actual angle change of the travel direction has fallen below the maximum value B/C of the rate of change $\Delta\phi/t$ for the direction indication. This updating can be seen in FIG. 4b.

When a longer-duration disturbance 2 of more than two seconds occurs, the indication of an angle change $\Delta\phi/t$ is again first suppressed and the indicated direction is retained. After that, an angle change $\Delta\phi/t$ is permitted again, but it is limited to the travelling-speed-dependent maximum values B/C according to FIG. 4b. In addition, a signal for averaging the measurement value deviations $\Delta x, y$ is generated during the time t2 of the disturbance 2 and the locus diagram 0 is correspondingly dynamically recalibrated. During this process, a smaller weighting is first suitably provided and an increasing weighting with a longer disturbance. In this manner, magnetic field changes in the vehicle due to connection or disconnection of electric loads can also be well compensated.

With the end of the measurement value deviations during the disturbance 2, the direction of the earth's magnetic field determined directly from the compass is now, however, processed without correction for determining the direction indication and this newly determined travel direction or north direction is then displayed without a readjustment limit, preferably delayed in time by several measurement cycles. Subsequently, any change in the direction indication is then determined by the evaluating circuit in the usual manner via the direction of the earth's magnetic field and is displayed. In this connection, the measurement values or their deviation from the locus diagram 0 is simultaneously checked at particular time intervals. During this process, a dynamic correction of the locus diagram 0 can also be performed in such a manner that even relatively small measurement value deviations are continuously utilized for correcting the locus diagram 0 by averaging. To avoid residual errors occuring due to a continuous averaging after relatively long disturbances, the averaging is then begun again.

We claim:

1. Method for determining a travel direction of a vehicle having an electronic compass including a magnetometer fixedly mounted in the vehicle and an evaluating circuit which cyclically receives measurement values delivered by the magnetometer, of the magnetic field vector acting on the magnetometer and processes the measurement values to check a predetermined elliptical locus diagram, and to determine parameters of the travel direction and to correct the locus diagram during a deviation of several successive measurement values (Px, y) from a predetermined part of a permissible range (A) of the locus diagram, comprising the steps of limiting to a predetermined value the rate of change ($\Delta\phi/t$) of the direction indicated by the compass, in response to a deviation ($\Delta x, y$) of the measurement values (Px, y) from the elliptical locus diagram (0) and with a simultaneous angle change ($\Delta\phi$) of the earth's magnetic field vector ($H_H$); and weighting the limiting value of the rate of change ($\Delta\phi/t$) of the direction indication in dependence on the duration (t1, t2) of the measurement value deviation.

2. Method according to claim 1 wherein a change in the direction indication ($\Delta\phi/t$) is suppressed with a short-time deviation of the measurement values (Px, y) from the elliptical locus diagram (0) past a predetermined amount ($\Delta x, y$).

3. Method according to claim 1, wherein with a longer-duration deviation of the measurement values (Px, y) from said permissible range (A) of the elliptical locus diagram (0), the rate of change ($\Delta\phi/t$) of the direction indication is limited to a maximum value (B, C) depending on the vehicle speed; and the maximum value (B, C) being cyclically calculated by the evaluating circuit from vehicle speed.

4. Method according to claim 2, wherein the maximum values (B, C) depending on the vehicle speed are calculated by a limit value of the permissible transverse acceleration of the vehicle stored in the data memory (12).

5. Method according to claim 4, wherein the maximum values (B, C) depending on the vehicle speed are calculated by means of a maximum permissible transverse vehicle acceleration, and by means of a maximum steering wheel angle of the vehicle, and that the greater one of the two values (A, B) is suppressed and the smaller one is compared with the measured direction change ($\Delta\phi/t$).

6. Method according to claim 3 wherein the rate of change ($\Delta\phi/t$) of the direction indication is continued with the maximum values (B, C) depending on the vehicle speed until it has fallen below the maximum values (B, C).

7. Method according to claim 1 wherein, with the end of the measurement value deviation the determined direction of the earth's magnetic field ($\vec{H}_H$) is now used without correction for determining the direction indication.

8. Method according to claim 7, wherein, at the end of the measurement value deviation, the uncorrected direction indication is taken over with a time delay.

9. Method according claim 1 wherein the elliptical circle diagram (0) is checked at particular time intervals and the circle diagram (0) is continuously corrected by averaging the measurement value deviations ($\Delta x, y$).

10. Method according to claim 9, wherein, with the end of the measurement value deviation, the averaging is begun again with the new measurement values (Px, y) then acquired.

* * * * *